Nov. 19, 1935.   C. E. MAYNARD   2,021,373
MOLD FOR RUBBER TUBES
Filed Aug. 1, 1933
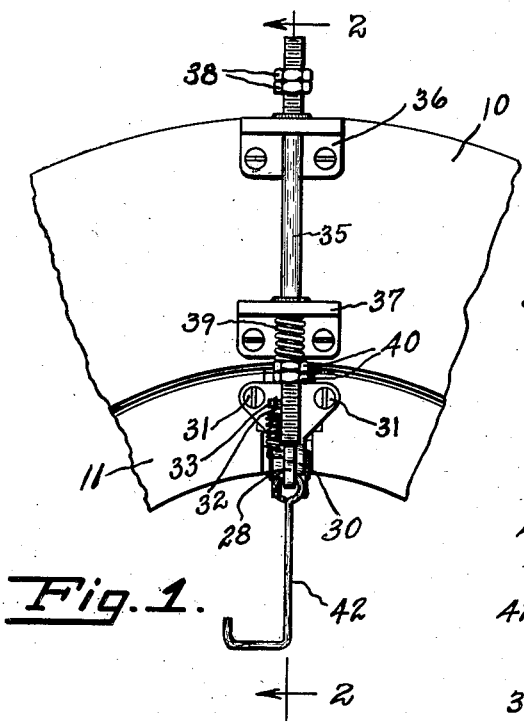
Fig. 1.
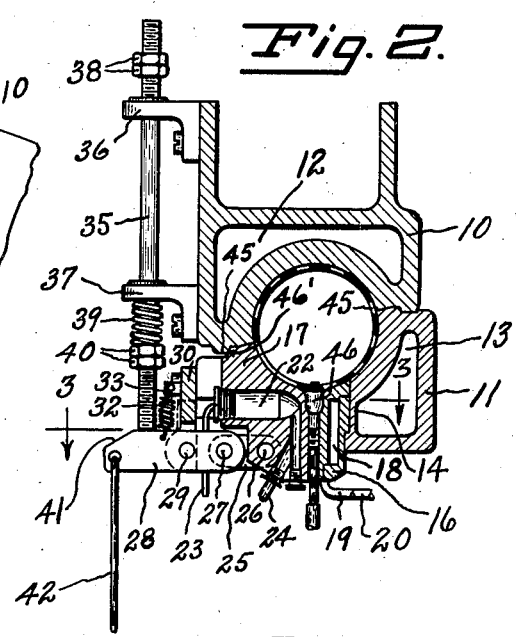
Fig. 2.
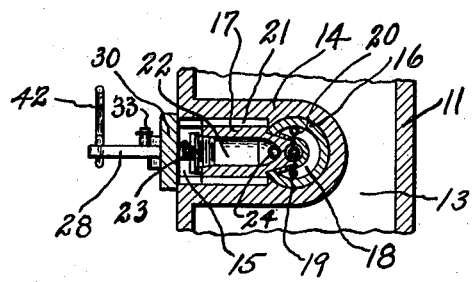
Fig. 3.
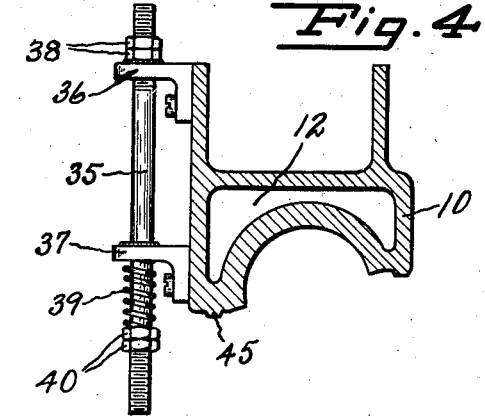
Fig. 4.
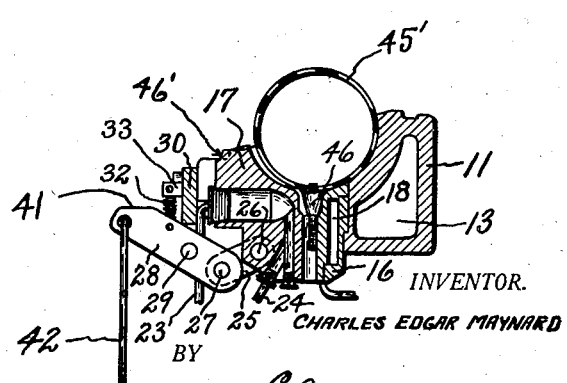
INVENTOR.
CHARLES EDGAR MAYNARD
BY
Chapin & Neal
ATTORNEY.

Patented Nov. 19, 1935

2,021,373

UNITED STATES PATENT OFFICE 2,021,373

MOLD FOR RUBBER TUBES

Charles Edgar Maynard, Northampton, Mass., assignor to The Fisk Rubber Corporation, Chicopee Falls, Mass., a corporation of Delaware Application August 1, 1933, Serial No. 683,119½

4 Claims. (Cl. 18—38)

My invention relates to vulcanizing molds used in the manufacture of inflatable rubber articles such as inner tubes for pneumatic tires and more particularly to such a mold provided with means for molding and vulcanizing the valve receiving portion of the article.

According to one practice in the construction of inner tubes, the valve mechanism is carried by a valve stem formed of rubber or rubber and fabric or by a metal tube covered or partially covered with rubber or rubber and fabric. It has been the practice to mold and cure or partially cure these valve stems to shape in separate molds. The cured or semi-cured stem was then cemented to the raw tube which was then placed in the tube vulcanizing mold and cured. This pre-curing of the valve stem is an element in the cost of the finished tire. In practice it is necessary or desirable to provide a thickness at the base of the stem sufficient to provide a substantial area of greater strength in that portion of the tube adjacent the valve stem to resist forces tending to separate the stem from the tube. This increases the thickness of the tube wall adjacent the base of the stem with the result that the degree of cure at that portion of the tube tends to vary from that of the tube as a whole.

It is the object of my invention to provide means by which the tube and rubber valve stem may be uniformly, simultaneously, and integrally molded and vulcanized in a single operation. The cost of molding and pre-curing the stem is eliminated and means are provided to secure a cure of the thickened tube wall adjacent the stem, uniform in degree with the rest of the tube.

Other and further objects will be apparent from the following specification and claims.

In the accompanying drawing, which illustrates one embodiment of my invention—

Fig. 1 is a side elevation of that portion of a tube vulcanizing mold which includes the valve stem portion of the mold, the mold being shown in closed or vulcanizing position;

Fig. 2 is a sectional view taken substantially on line 2—2 of Fig. 1;

Fig. 3 is a sectional view taken substantially on line 3—3 of Fig. 2; and

Fig. 4 is a view similar to Fig. 2, but showing the mold open.

The vulcanizing mold proper may be of any suitable form, that shown including an outer mold section 10 and an inner mold section 11. In one conventional form the inner section 11 is in the form of an annulus or ring, the outer mold section being formed in segments which may be moved away from the inner section as indicated in Fig. 4, to permit the raw or vulcanized tube to be seated on the inner section.

The mold section 10 is provided with a steam chamber 12 and section 11 with a similar chamber 13 by which the mold is heated to effect vulcanization of the tube.

According to my invention the wall of the inner mold section is provided with a boss 14 cut aawy at the point where the valve stem is accommodated, which boss extends into the steam chamber 13 (see Fig. 3) and is provided with a recess 15 to receive the valve stem molding and vulcanizing unit comprising two members 16 and 17. Member 16, which is fixed in position with respect to section 11, is provided with an individual steam chamber 18, through which steam is circulated by pipes 19 and 20, and is provided at the side with an opening into which member 17 fits to complete the valve stem molding chamber. Member 17 is mounted to reciprocate in recess 15 toward and from fixed member 16, gibs or ways 21 being provided to guide it in its movement. Member 17 is provided with an independent steam chamber 22 through which steam is circulated by pipes 23 and 24.

The means for moving member 17 in ways 21 comprises a link 25 having one end pivoted at 26 to member 17 and the other end pivoted at 27 to the inner end of a lever 28. Lever 28 is pivoted at 29 to a bracket 30 secured by screws 31 to the mold section 11. A spring 32 connected between lever 28 and a lug 33 formed on bracket 30 tends to swing lever 28 in a clockwise direction as viewed in Figs. 2 and 4, and thus draw member 17 outwardly, as shown in Fig. 4.

A rod 35 is slidably mounted in guide brackets 36 and 37 secured to mold section 10, the downward movement of the rod in the guides being adjustably limited by locking nuts 38 threaded on the upper end of the rod. The rod is urged downwardly in its guides by a spring 39 surrounding the lower end of the rod and engaging between the bracket 37 and locking nuts 40 threaded on the lower end of rod 35.

The rod 35 is of such length that when the mold section 10 moves from the open position shown in Fig. 4 toward the mold section 11 in closing the mold, the end of rod 35 engages the end of lever 28, which is provided with an inclined cam surface 41 to facilitate such engagement; and spring 39 is made of sufficient strength to overcome spring 32 and swing lever 28 counter-clockwise to move the valve stem molding member 17 into mating relation with member 16 prior to the complete closing of mold sections 10 and 11, spring 39 yielding under the final closing movement of section 10, as shown in Fig. 2. The outer end of lever 28 is provided with a handle 42 by which the lever 28 may be manually operated, if desired.

In operation, assuming the mold to be open, a raw tube 45 having a valve stem 46, formed at least partly of rubber, is placed in the mold as shown in Fig. 4. As shown in this figure member 17 of the valve molding and curing unit is held in outward position by spring 32 permitting easy insertion of the valve stem between the members 16 and 17. The mold sections 10 and 11 are then moved to closed position by conventional means not shown. As mold section 10 approaches section 11 the lower end of rod 35 engages cam surface 41 and the adjustment of nuts 38 is made such that prior to the final seating of section 10 on section 11, lever 28 has been moved to substantially the position shown in Fig. 2 to thereby close the valve stem molding unit 16—17 prior to the closure of the mold proper. In the completion of the closing movement of tube mold section 10 rod 35 is merely raised in guides 36 and 37 against spring 39 and beveled rib 45 engages the beveled surface 46' of molding member 17 to lock and hold the molding member in the position shown in Fig. 2.

The action of beveled rib 45 on face 46' of member 17 insures proper closing and positioning of molding unit 16—17 in event the valve stem molding units are not entirely closed prior to the closure of the mold members 10 and 11. In the opening of the mold 10—11 the reverse action takes place; lever 28 being held in the position shown in Fig. 2 under the action of spring 39 until sections 10 and 11 have been separated a predetermined distance and nuts 38 engage guide 36 to move rod 35 away from lever 28, permitting the latter to move under the influence of spring 32 to open the valve molding unit, and allow easy removal of the tube and valve stem.

Handle 42 permits manual closing of unit 16—17 in advance of the action of rod 35 if conditions indicate to the operator this is advisable, and also permits the operator to manually break open the unit 16—17 in the event that the adhesion of the stem to the valve molding member 17 is sufficient to overcome spring 32. Normally the operation is entirely automatic.

The independence of steam chambers 18 and 22 from chamber 13 permits a higher temperature to be maintained therein than in chambers 10 and 13, so that a uniform degree of cure is obtained throughout the tube in spite of the increased volume of rubber adjacent the valve stem.

Having thus described my invention, I claim:

1. A vulcanizing mold of the character described including separable heated mold sections, one of said sections being provided with a valve stem molding unit comprising a relatively stationary mold member and a movable mold member, said members presenting molding surfaces for shaping the rubber constituents of the valve stem of the article to be vulcanized, means automatically operable to move said movable member toward and from said stationary member in a predetermined timed relation to the closing movements of the sections, and means to heat said members to effect vulcanization of the valve stem simultaneously with the vulcanization of the body of the article.

2. A vulcanizing mold of the character described including separable, heated mold sections, one of said sections being provided with a valve stem molding unit comprising a relatively stationary mold member and a movable mold member, said members presenting molding surfaces for shaping the rubber constituents of the valve stem of the article to be vulcanized, means to move said movable member toward and from said stationary member, means to normally hold said movable member separated from the stationary member and means automatically operative upon closing movement of said sections to move said movable member into closed relation with the stationary member prior to the complete closure of said sections.

3. A vulcanizing mold of the character described including separable inner and outer mold sections, said inner sections being provided with a valve stem molding unit comprising a mold member fixed in the section and a movable mold member, mounted in the section for sliding movement toward and from the fixed member, said members being formed with molding surfaces for shaping the rubber constituents of the valve stem of the article to be vulcanized, a lever pivoted to the inner section, a link connecting one end of the lever to said movable member, a spring acting on said lever and normally holding the movable member spaced from the fixed member, and a rod yieldably carried by the outer section and positioned to engage the outer end of said lever upon closing movement of the sections to move the movable member into closed relation with the fixed member prior to complete closure of the sections.

4. A vulcanizing mold of the character described including separable inner and outer mold sections, means to heat said sections, a valve stem molding unit forming part of said inner section and comprising a mold member fixed in said inner section, a movable mold section mounted in the inner section for movement toward and from the fixed member, said members being formed with molding surfaces for shaping the rubber constituents of the valve stem of the article to be vulcanized, a lever pivoted to the inner section, a link connecting one end of the lever to said movable member, a spring acting on said lever and normally holding the movable member spaced from the fixed member, a rod yieldably carried by the outer section and positioned to engage the outer end of said lever upon closing movement of the sections to move the movable member into closed relation with the fixed member prior to complete closure of the sections, and means to heat said members independently of the means for heating the sections.

CHARLES EDGAR MAYNARD.